(12) United States Patent
Henche et al.

(10) Patent No.: US 9,873,163 B2
(45) Date of Patent: Jan. 23, 2018

(54) WELDING WIRE CONVEYOR DEVICE

(75) Inventors: Klaus Henche, Löhnberg (DE); Hubert Metzger, Lich (DE); Andre Faber, Fernwald (DE)

(73) Assignee: ALEXANDER BINZEL SCHWEISSTECHNIK GMBH & CO. KG, Buseck (DE)

( * ) Notice: Subject to any disclaimer, the term of this patent is extended or adjusted under 35 U.S.C. 154(b) by 1184 days.

(21) Appl. No.: 13/983,210

(22) PCT Filed: Feb. 28, 2012

(86) PCT No.: PCT/EP2012/053303
§ 371 (c)(1),
(2), (4) Date: Aug. 1, 2013

(87) PCT Pub. No.: WO2012/116966
PCT Pub. Date: Sep. 7, 2012

(65) Prior Publication Data
US 2013/0327750 A1  Dec. 12, 2013

(30) Foreign Application Priority Data
Feb. 28, 2011 (DE) .................. 10 2011 000 961

(51) Int. Cl.
*B23K 9/32* (2006.01)
*B23K 9/133* (2006.01)

(52) U.S. Cl.
CPC .............. *B23K 9/327* (2013.01); *B23K 9/133* (2013.01); *B23K 9/1336* (2013.01)

(58) Field of Classification Search
CPC ...... B23K 9/1336; B23K 9/327; B23K 9/133; Y10T 403/7037; Y10T 403/60; Y10T 403/602; Y10T 403/604; B65H 2404/144; B65H 2404/1441; B65H 2404/1442; B65H 51/10
USPC ....... 219/137.31, 137.2, 137.7, 137.8, 137.9, 219/138–143; 403/326, 327, 360; 226/176, 177, 186, 187
See application file for complete search history.

(56) References Cited

U.S. PATENT DOCUMENTS

2006/0278624 A1    12/2006 Christopher et al.
2007/0119840 A1*    5/2007 Flattinger ............ B23K 9/1336
                                                    219/137.31

FOREIGN PATENT DOCUMENTS

DE        301124        11/1928
GB        301125        11/1928

OTHER PUBLICATIONS

English translation of International Search Report and Written Opinion for International Application No. PCT/EP2012/053303.
(Continued)

*Primary Examiner* — Dana Ross
*Assistant Examiner* — James Sims, III
(74) *Attorney, Agent, or Firm* — Warner Norcross and Judd LLP

(57) ABSTRACT

A welding wire conveyor device (1) and a method for locking a pivotable roll receiver off the welding wire conveyor device (1). The device includes a drive roll receiver (11) and a pivotable pressure roll receiver (10). The pressure roll receiver (10) is coupled to a pivotable actuation mechanism (20) enabling movement to a pivoted position. The pressure roll receiver (10) may be locked in the pivoted position by a locking device (200).

5 Claims, 3 Drawing Sheets

(56) References Cited

OTHER PUBLICATIONS

International Search Report and Written Opinion from the PCT application.

* cited by examiner

WELDING WIRE CONVEYOR DEVICE

BACKGROUND OF THE INVENTION

The invention relates to a welding wire conveyor device.

A multitude of welding wire conveyor devices for conveying welding wire to a welding torch are known from the prior art. The welding wire conveyor device is arranged between a welding wire receptacle and the welding torch and is preferably used if the welding wire is to be conveyed across particularly large distances, as is the case in shipbuilding, bridge engineering and hall construction, for example. In this context, the welding wire is supplied by a cable assembly package to the welding wire conveyor device and thereafter to the welding torch.

DE 10 2005 041 695 B4 describes a welding wire conveyor device which has a drive roll and a pivotable counter-pressure roll. A lever is actuated in order to pivot the counter-pressure roll in a direction away from the drive roll receiver. The lever is coupled to a spring such that the counter-pressure roll is pivoted immediately in a direction toward the drive roll receiver, as soon as the lever is no longer actuated.

The disadvantage of this embodiment is that it requires at least two persons to insert the welding wire into the welding wire conveyor device. Inserting the welding wire in this way may become necessary, if the welding wire breaks loose during operation, or if a new welding wire is needed for welding. To insert the welding wire into the welding wire conveyor device it is necessary that the user actuates the lever in order to move the counter-pressure roll away from the drive roll. Without actuating the lever there is the risk that the welding wire buckles during the insertion into the welding wire conveyor device, because of the small space between the counter-pressure roll and the drive roll. This means that the first user must actuate the lever during the entire insertion process to prevent the welding wire from buckling. When actuating the lever, the user must guide the welding wire such that the welding wire does not bypass the drive roll but instead is moved between the drive roll and the counter-pressure roll.

Since the user needs one hand for actuating the lever and must use the other hand to guide the welding wire between the drive roll and the counter-pressure roll, another person is required to operate a current source device. The current source device must be operated, since it facilitates advancing a de-energized welding wire into the welding wire conveyor device.

US 2006/0 278 624 A1 discloses a welding wire conveyor device with two roll receivers on which two rolls are arranged. The first roll is coupled to a pivoted lever. When the pivoted lever is pivoted from a first position into a second position, an abutment section of the pivoted lever strikes against a protruding section of a bearing section, on which the first roll is supported. By the pushing the pivoted lever against the protruding section, the first roll will be pivoted about a fulcrum. After the first roll has been pivoted, it will be locked in this pivoted position. The pivoted lever is moved translatory for this purpose.

Furthermore, GB 301 125 A discloses a welding wire conveyor device with two conveyor rolls arranged on separate roll receivers, wherein one of the roll receivers can be pivoted from a first position into a second position against the force of a spring by means of a multiple-part lever mechanism. In order to lock the roll receiver in the second position, a second lever mechanism with a latch hook is provided, which can be engaged with a corresponding latch recess on a part of the first lever mechanism. A spring is moreover provided on the second lever mechanism, which automatically closes the latch connection when pivoting the roll receiver into the second position. On the other hand, to pivot the roll receiver back into the first position, it is necessary to first disconnect the latch connection manually by actuating the second lever mechanism. Such type of a locking device with two, in particular multiple-part lever mechanisms, is very complex in terms of engineering, however, and is therefore cost-intensive and moreover complicated to handle.

SUMMARY OF THE INVENTION

An object of the invention consists in providing a welding wire conveyor device which does not have the above-mentioned disadvantages.

The problem is solved by the present invention. A welding wire conveyor device includes at least two roll receivers. At least one of the roll receivers is designed so that it can be pivoted and is coupled to a pivotable actuation mechanism. The pivotable actuation mechanism includes a locking mechanism, which locks the position of the roll receiver.

According to the invention, the locking mechanism includes a locking device and a compressible pressure mechanism coupled to the locking device. The locking device includes an outer perimeter defining at least one recess. The pressure mechanism has a greater length along its axis facing the locking device when it extends into the recess than when the pressure means is in contact with the outer perimeter of the locking device.

Advantageously, the pressure mechanism can be coupled to the outer perimeter of the locking device. The locking device may be cylindrical and have at least one recess along the outer perimeter extending in the longitudinal direction. The compressible pressure means may be preloaded in the direction toward the locking means and may be compressed when the pressure means is in contact with the outer perimeter of the locking device. The compressible pressure mechanism can also be in contact with a bottom of the recess. The locking device and the compressible pressure mechanism may be latched and unlatched.

The length of the recess along one axis of the pivotable actuation mechanism may be selected such that it is ensured during an axial movement of the pivotable actuation means along the center axis of the actuation means that the pressure means extends into the recess and/or is in contact with the area protruding from the recess.

The roll receivers may include one drive roll receiver for receiving a drive roll and one pressure roll receiver for receiving a pressure roll. The welding wire conveyor device can moreover include a drive means, in particular a worm gear shaft, for driving the drive roll receiver and therefore the drive roll. Within the meaning of the invention, a pressure roll is to be understood as a roll by means of which tension and/or pressure is exerted on the welding wire and/or on a welding wire electrode. The pressure roll receiver and thus the pressure roll can be driven by the drive means analogously to the drive roll receiver.

The provision of a locking mechanism offers the advantage that the user of the welding wire conveyor device must actuate the pivotable actuation means only briefly in order to bring the roll receiver into a pivoted position. This means that due to the locking of the position of the pivotable roll receiver, it is no longer necessary to actuate the pivotable actuation mechanism during the entire insertion process of the welding wire into the welding wire conveyor device.

This therefore simplifies the handling of the welding wire conveyor device during the insertion process.

A further advantage of the embodiment according to the invention consists in that two persons are no longer required for inserting the welding wire into the welding wire conveyor device. This results, because the pivotable actuation means must no longer be activated during the entire welding wire insertion process, so that the user can operate the current source device on his own.

The current source device is to be understood among other things as a device for controlling the entire welding process in addition to providing the welding current. The current source device can be adjusted to whether the welding wire will be supplied with current or not and/or whether the welding wire is to be advanced, particularly whether the welding wire is to be advanced de-energized, for example. Naturally, even further parameters of the welding process can be adjusted by the current source device.

By actuating the pivotable actuation mechanism, the roll receiver can be pivoted into different positions. The roll receiver is thus in an operating position, if the pivotable actuation mechanism is not actuated. When the pivotable actuation mechanism is actuated, the roll receiver can be moved into a welding wire insertion position. The welding wire insertion position is understood to be as the position of the roll receiver at which the pivotable roll receiver has moved away from the other roll receiver far enough, so that a de-energized welding wire advance for inserting the welding wire between the two rolls, in particular the pressure roll and the drive roll, can be carried out. As previously mentioned, it is advantageously possible for a single-user to operate the current source device regarding the de-energized welding wire advance and at the same time guide the welding wire between the two rolls. In this instance, the pairs of rolls are arranged reciprocally such that both the smallest possible as well as the largest possible welding wire electrodes can be inserted without producing additional friction resistance while being guided securely at the same time.

The roll receiver can moreover be moved into a roll change position such that the roll of the roll receiver can be changed easily.

And it is naturally also possible that the welding wire conveyor device is designed such that the welding wire insertion position corresponds to the roll change position.

In an advantageous development of the invention, a sensor can be provided inside the welding wire conveyor device, which determines the position of the roll receiver and/or the roll. The sensor can thus transmit a signal to the current source device to initiate a de-energized welding wire advance when the roll receiver is in the welding wire insertion position. The handling of the welding wire conveyor device is consequently simplified, since the user only has to still guide the welding wire between the two rolls, in particular the pressure roll and the drive roll, and has no further tasks such as operating the current source device.

The sensor can furthermore transmit to the current source device that no welding wire advance is to be done when the roll receiver is in the roll change position. A further sensor can obviously also be provided, which determines the position of the roll receiver and transmits the previously mentioned signal to the current source device. By blocking a welding wire advance when the roll receiver is in the roll change position, it can be prevented that the switch on the welding torch or on the current source is actuated unintentionally during a roll change.

The roll receivers, particularly the pressure roll receiver, can be coupled to a bushing, wherein the bushing can be coupled to the pivotable actuation mechanism. In addition, the bushing is coupled to a preloading means used to exert a tightening force on the bushing. This tightening force can be transmitted to the welding wire by means of the bushing on the roll receiver, in particular the pressure roll receiver, and the roll, particularly the pressure roll. The preloading means can have a spring, which is coupled on one end to the bushing and on the other end to a worm screw. The tension force acting on the welding wire can be adjusted with the worm screw.

The pivotable actuation means can be coupled to the bushing on the end of the roll receiver, in particular the pressure roll receiver, facing the pivotable actuation means. The pivotable actuation mechanism therefore has a coupling section on the end facing the roll receiver for coupling onto one end section of the bushing of the roll receiver. The end section of the bushing of the roll receiver can be designed such that same can enclose, at least partially, a section of the pivotable actuation mechanism, which may be shaped cylindrically. In this context, the enclosing of the pivotable actuation mechanism occurs in an area of the pivotable actuation mechanism that is provided between the coupling section and the end of the pivotable actuation mechanism that is distant from the bushing of the roll receiver.

The end section can be designed such that it has two projections and one base section, wherein the projections protrude from the base section. The pivotable actuation mechanism can be provided between the two projections.

The coupling section is designed such that it can have a larger diameter than the section of the pivotable actuation mechanism that is partially enclosed by the bushing of the roll receiver. The coupling section can furthermore be designed such that it is brought into contact with the end section of the bushing of the roll receiver, at least during a longitudinal movement of the pivotable actuation mechanism in a direction in which the two roll receivers move away from each other, and particularly when the pressure roll receiver moves into a direction away from the drive roll receiver. In this way, the coupling section can be brought into contact with the projections and with the base section of the end section.

The coupling of the preloading means and the pivotable actuation mechanism to the bushing can occur such that a rotation of the bushing and thus of the roll receiver occurs about a pivot pin which, due to the tightening force, is opposite to the rotation of the bushing, which results by actuation of the pivotable actuation mechanism. Such type of coupling is a simple method to ensure that the bushing and therefore the roll receiver can be pivoted both in the direction away from the other roll receiver, for example the welding wire insertion position, as well as also in a direction to the other roll receiver, for example into the operating position.

The pivotable actuation mechanism can be designed so that it can be moved along its longitudinal axis. This can be accomplished for example in that the pivotable actuation mechanism comprises an external thread that is coupled to an internal thread, which is coupled to a bushing of the roll receiver, for example. The internal thread can alternatively be provided in a bush that will be coupled to the external thread and will be held by the user while the pivotable actuation mechanism is actuated. Since the bushing of the roll receiver is stationary and/or non-rotatable, and/or the bush is held by the user and therefore is stationary and/or non-rotatable, it will move along its longitudinal axis during the rotation of the pivotable actuation means.

To be precise, the pressure mechanism can be coupled to the outer perimeter of the locking device. The locking device can be cylindrical and include at least one recess along its outer perimeter which extends in the longitudinal direction of the locking device. The pressure mechanism can be designed as a means that is preloaded and can be compressed in the direction toward the locking device, when the pressure mechanism is in contact with the area protruding from the recess of the locking device.

When the roll receiver is in the locked condition, the pressure mechanism extends into the recess of the locking device. Locking can be accomplished in that the pressure mechanism engages in the recess. As mentioned above, the preloading mechanism exerts a force on the bushing, which also acts on the pivotable actuation mechanism, because the bushing is coupled to the pivotable actuation mechanism. For this purpose, because of the force transmitted from the bushing to the pivotable actuation mechanism, a force is exerted in the longitudinal direction that is directed opposite to the longitudinal direction, which produces the roll receiver to pivot in a direction away from the other roll receiver.

Because the pivotable actuation mechanism is coupled to the exterior thread and/or the bush by means of the internal thread, the tightening force would produce the pivotable actuation mechanism to turn if no locking device were provided. The pressure mechanism extending into the recess prevents the pivotable actuation mechanism from turning. The locking by the pressure mechanism will occur as long as the tightening force and thus the force exerted by the areas protruding from the recess onto the pressure mechanism is smaller than that force required for compressing the pressure mechanism. The result is that because of the cylindrical design of the locking device with at least one recess and the provision of the pressure mechanism, it is possible to accomplish a simply designed locking device.

Additional objectives, advantages, features and possible applications of the present invention result from the following description of an embodiment with reference to the drawing. In this context, any described and/or illustrated features are in principle the subject of the present invention, either on their own or in any useful combination.

DESCRIPTION OF THE CURRENT EMBODIMENT

Figure 1:
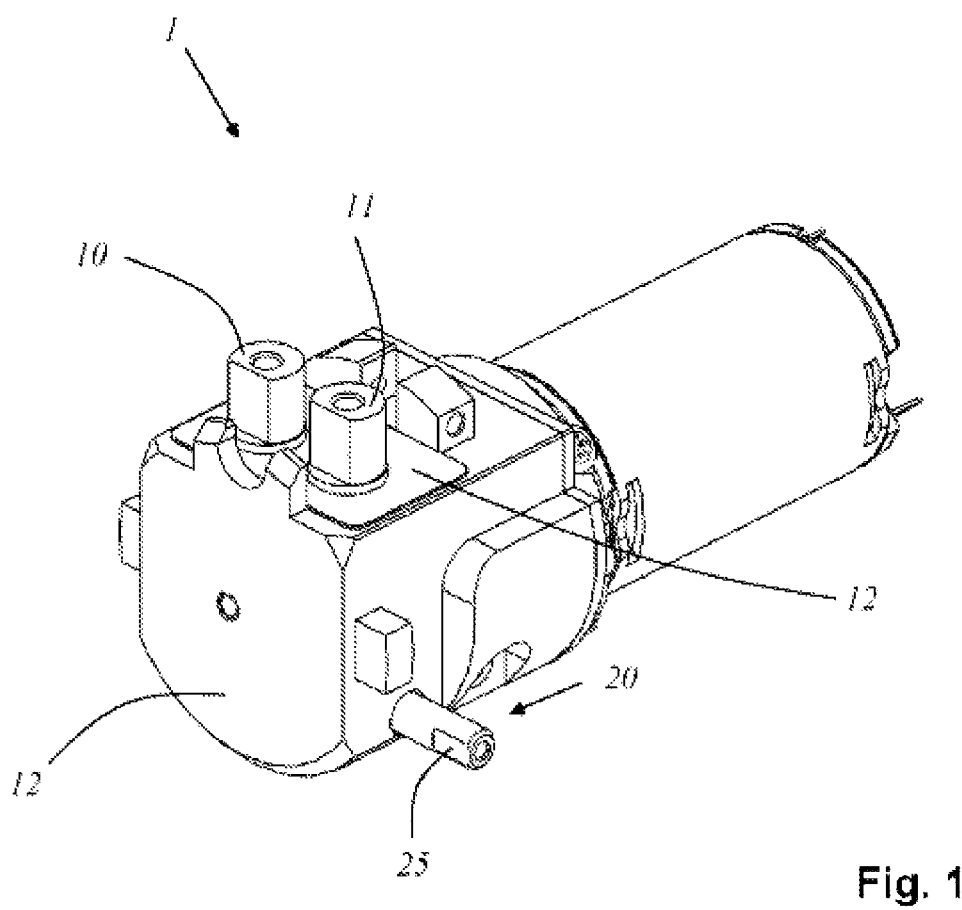
FIG. 1 is a perspective view of the welding wire conveyor device.

The welding wire conveyor device 1 shown in FIG. 1 has a drive roll receiver 11 and a pressure roll receiver 10. The pressure roll receiver 10 and the drive roll receiver 11 extend from a casing 12. To be precise, the pressure roll receiver 10 and the drive roll receiver 11 each extend from the casing 12 from an upper plate 13 mounted on the casing 12.

Drive and/or pressure rolls (not shown) are fitted onto the drive roll receiver and/or the pressure roll receiver 10, 11, which between them receive and convey the welding wire to be conveyed. The welding wire conveyor device 1 furthermore comprises a pivotable actuation mechanism or means 20, which extends from the casing 12.

Figure 2:
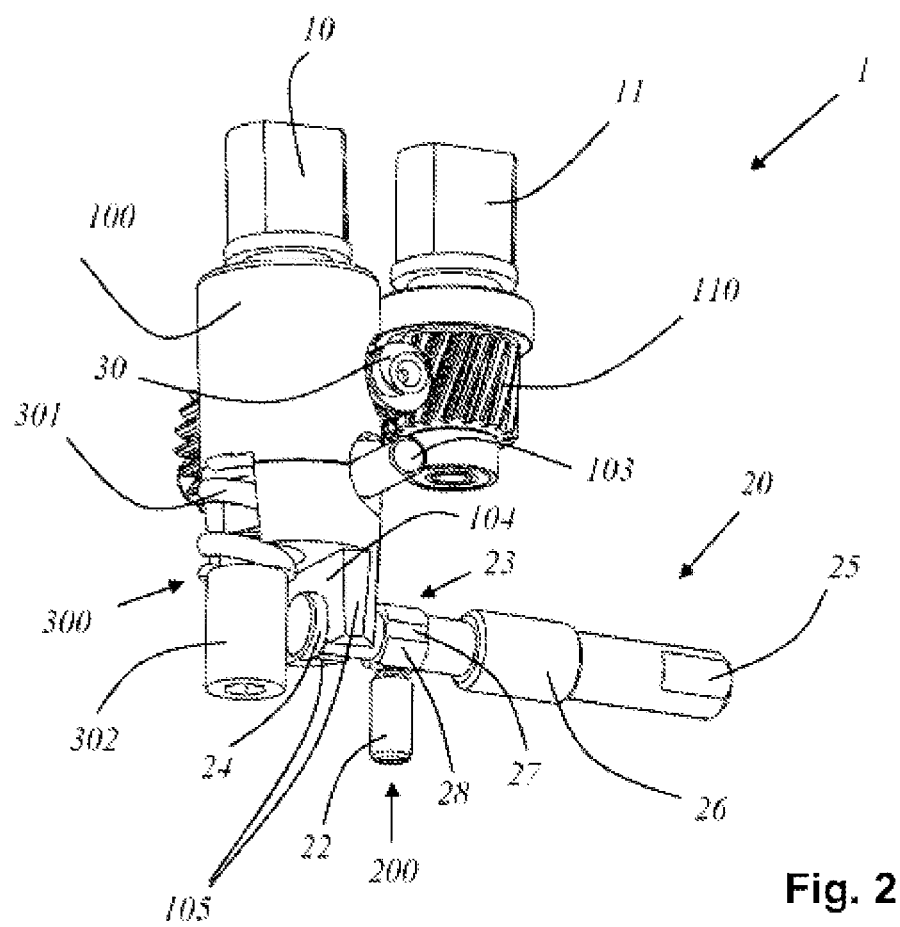
FIG. 2 is a perspective illustration of a view of the welding wire conveyor device without the casing.

FIG. 2 shows the welding wire conveyor device 1 without the casing 12. The pressure roll receiver 10 is coupled to a bushing 100. In addition, the pressure roll receiver 10 is coupled to a drive roll receiver gear 110. Both the pressure roll receiver 10 as well as the bushing 100 are pivotable roll receiver relative to a pivot pin 103. The bushing 100 is coupled to a preloading means 300, which comprises a spring 301 and a worm screw 302 and exerts a tightening force onto the bushing 100. The tightening force is aligned such that the pressure roll receiver 10 and the bushing 100 rotate around the pivot pin 103 in a direction toward the drive roll receiver 11, for example in the operating position.

The bushing 100 in an end section 104 partially encompasses a section of the pivotable actuation means 20, wherein the end section 104 comprises two projections 105 extending from a base section. The projections 105 are provided relative to the base section such that the partially encompassed section of the pivotable actuation means 20 is provided between the two projections 105.

The pivotable actuation mechanism 20 comprises on one end a latching area 25 for the engagement of a lever (not shown) for rotating the pivotable actuation mechanism 20. The pivotable actuation mechanism 20 furthermore has a coupling section 24 on the end facing away from the latching area 25, which comprises a larger diameter than the section of the pivotable actuation mechanism 20 which is encompassed by the end section 104. The coupling section 24 is designed such that same can be brought into contact with the end section 104 and/or the projections 105 of the bushing 100. To be precise, the coupling section 24 can be coupled to the base section and with both projections 105, when the pivotable actuation mechanism 20 is moved so that the pressure roll receiver 10 moves in a direction away from the drive roll and/or the drive roll receiver. The pivotable actuation mechanism 20 furthermore comprises an external thread 21, which is coupled to an internal thread (not shown).

In addition, the pivotable actuation mechanism 20 is provided with a locking mechanism 200, comprising a locking device 23 and a compressible pressure mechanism 22. The locking device 23 has a cylindrical design, wherein several recesses 27 are provided along the longitudinal direction of the locking device 23. The pressure mechanism 22 is designed such that it can be in contact with the outer perimeter of the locking device 23. This means that the pressure mechanism 22 can extend into the recess 27 and/or contact the base of the recess 27 or be in contact with the protruding areas 28 of the locking device 23, relative to the recess 27. The pressure mechanism 22 is arranged stationary and is designed compressible.

Figure 3:
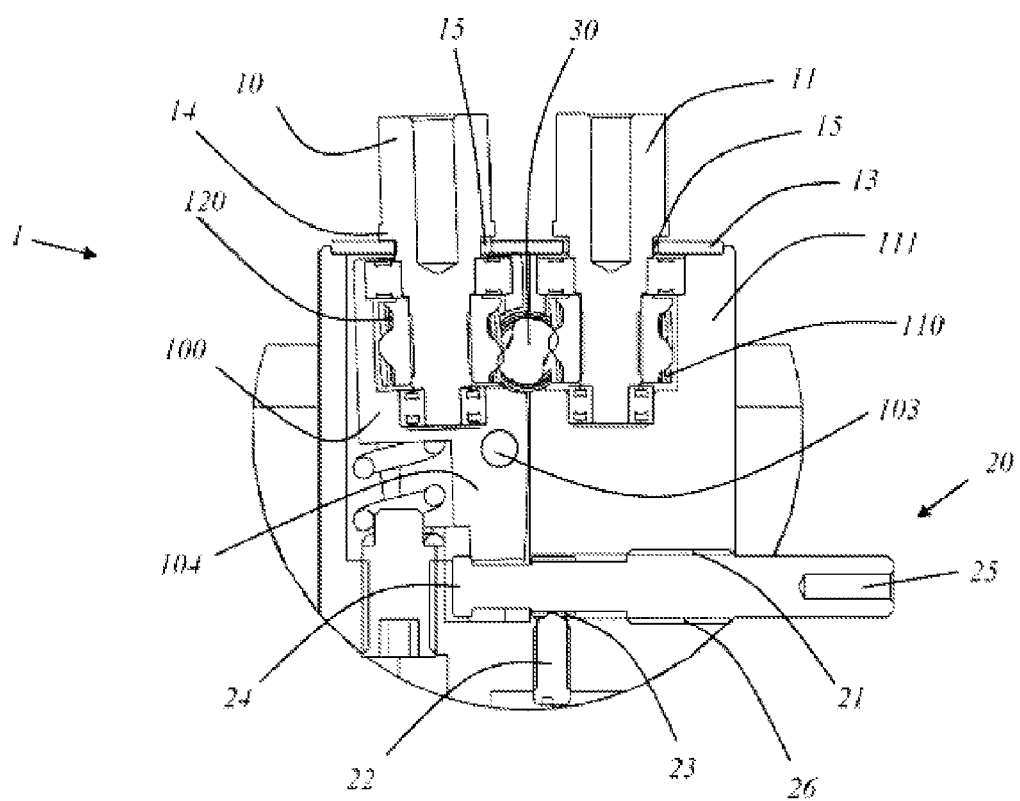
FIG. 3 is a lateral sectional view of the welding wire conveyor device.

As FIG. 3 shows, the drive roll receiver 11 is coupled to a bushing 111 and a drive roll receiver gear 110. Both the pressure roll receiver 10 as well as the drive roll receiver 11 are in contact with a worm gear shaft 30 by means of their respective gear 110, 120. The worm gear shaft 30 is driven by means of a drive that is not illustrated in FIG. 2, as a result of which the pressure roll receiver 10 and the drive roll receiver 11 are also driven. The drive roll receiver 11 and the pressure roll receiver 10 extend partially across the opening 15 of the upper plate 13 from same and the casing 12.

The arrangement of the welding wire conveyor device 1 illustrated in FIG. 3 shows the pressure roll receiver 10 in a locked position moved away from the drive roll receiver 11, such as in the welding wire insertion position. The coupling section 24 is in contact with the end section 104 of the bushing 100 of the pressure roll receiver 10. The pressure mechanism 22 extends into the recess 27 of the locking device 23, to ensure that the pivotable actuating mechanism 20 cannot rotate and thus cannot execute a longitudinal movement. The bushing 100 and thus the pressure roll receiver 10 are pivoted until a contact area 14 that protrudes from the casing 12 strikes against the upper plate 13. The contact area 14 protrudes from the remaining area of the pressure roll receiver 10 in a direction transverse to a center axis of the pressure roll receiver.

The pivoting process of the pressure roll receiver 10 is explained in the following. The pivotable actuation mechanism 20 is rotated by means of a lever (not shown) for example, which is coupled to the latching area 25 of the pivotable actuation mechanism 20. Depending on the direction of rotation of the pivotable actuation mechanism 20, same is moved because of the coupling of the pivotable actuation mechanism 20 to the internal thread in a direction toward the preloading mechanism 300, or in a direction away from the preloading mechanism 300.

To pivot the pressure roll receiver 10 in a direction away from the drive roll receiver 11, the pivotable actuation mechanism 20 must be rotated such that it moves in a direction away from the preloading mechanism 300. In this context, the coupling section 24 strikes against the end section 104 of the bushing 100, and/or against its projections 105 and the bushing 100 and therefore the pressure roll receiver 10 are rotating and/or pivoting or tilting about the pivot pin 103 in a direction away from the drive roll receiver 11. The pressure roll receiver 10 is locked in the pivoted position as soon as the pressure mechanism 22 extends into the recess of the locking device 23 and/or contacts the base of the recess 27.

The position of the bushing 100 and/or the pressure roll receiver 10 is determined by means of a sensor (not shown). In the event, that the pressure roll receiver 10 is located in the welding wire insertion position, the sensor transmits a signal to a current source device. As soon as the current source device receives the signal, the current source device initiates a de-energized welding wire advance.

LIST OF REFERENCE SYMBOLS

1 Welding Wire Conveyor Device
10 Pressure roll receiver
11 Drive roll receiver
12 Casing
13 Upper plate
14 Contact area
15 Opening
20 Pivotable actuation mechanism or means
21 External thread
22 Pressure mechanism or means
23 Locking device
24 Coupling section
25 Latching area
26 Bushing
27 Recess
28 Areas
30 Worm gear shaft
100 Bushing of the pressure roll receiver
103 Pivot pin
104 End section
105 Projection
110 Drive roll receiver gear
111 Bushing of the drive roll receiver
120 Pressure roll receiver gear
200 Locking mechanism
300 Preloading mechanism
301 Spring
302 Worm screw

The invention claimed is:

1. A welding wire conveyor device (1) comprising:
a drive roll receiver (11);
a pressure roll receiver (10);
a pivotable actuation mechanism (20), at least one of the roll receivers supported by the pivotable actuation mechanism, the pivotable actuation mechanism (20) adapted to lock the at least one of the roll receivers in a position; and
a locking mechanism (200) including:
a locking device (23) having an outer perimeter including a recess; and
a compressible pressure mechanism (22) engageable with the outer perimeter of the locking device (23), the compressible pressure mechanism having an axis aligned with the outer periphery of the locking device, the compressible pressure mechanism having a length along the axis, the length being greater when the compressible pressure mechanism extends into the recess than when the compressible pressure mechanism is in contact with the outer perimeter of the locking device, the at least one of the roll receivers being locked in the position when the compressible pressure mechanism (22) extends into the recess of the locking device (23).

2. The welding wire conveyor device (1) according to claim 1, wherein the pivotable actuation mechanism includes a longitudinal axis, the pivotable actuation mechanism (20) being shiftable along the longitudinal axis.

3. The welding wire conveyor device (1) according to claim 2, further comprising a preloading mechanism (300) forcing the pressure roll receiver toward the drive roll receiver.

4. The welding wire conveyor device (1) according to claim 1, wherein the pressure roll receiver (10) is coupled to a bushing (100) coupled to the pivotable actuation mechanism (20).

5. The welding wire conveyor device (1) according to claim 1, wherein the pressure roll receiver (10) comprises a second drive roll receiver.

* * * * *